(12) United States Patent
MacFarlane et al.

(10) Patent No.: US 12,437,219 B2
(45) Date of Patent: Oct. 7, 2025

(54) SYSTEMS AND METHODS FOR EFFICIENT PHOTONIC HERALDED QUANTUM COMPUTING SYSTEMS

(71) Applicant: Anametric, Inc., Austin, TX (US)

(72) Inventors: Duncan L. MacFarlane, Dallas, TX (US); Mitchell A. Thornton, Dallas, TX (US); William V. Oxford, Austin, TX (US)

(73) Assignee: ANAMETRIC, INC., Austin, TX (US)

( * ) Notice: Subject to any disclaimer, the term of this patent is extended or adjusted under 35 U.S.C. 154(b) by 977 days.

(21) Appl. No.: 17/468,358

(22) Filed: Sep. 7, 2021

(65) Prior Publication Data

US 2022/0076155 A1 Mar. 10, 2022

Related U.S. Application Data

(60) Provisional application No. 63/075,369, filed on Sep. 8, 2020.

(51) Int. Cl.
*G06N 10/00* (2022.01)
(52) U.S. Cl.
CPC .................... *G06N 10/00* (2019.01)
(58) Field of Classification Search
CPC ....................................................... G06N 10/00
USPC .............................................................. 703/2
See application file for complete search history.

(56) References Cited

U.S. PATENT DOCUMENTS

| | | | |
|---|---|---|---|
| 7,767,976 B2* | 8/2010 | Allen | G01S 17/00 |
| | | | 250/393 |
| 10,372,014 B1* | 8/2019 | Vidrighin | G02F 1/3536 |
| 10,832,155 B2* | 11/2020 | Lechner | G06N 10/60 |
| 11,493,714 B1* | 11/2022 | Mendoza | H01L 24/47 |
| 2009/0016386 A1* | 1/2009 | Edamatsu | G02F 1/39 |
| | | | 250/503.1 |
| 2013/0258453 A1* | 10/2013 | Arahira | G02F 1/39 |
| | | | 359/330 |
| 2018/0048110 A1* | 2/2018 | Jestin | H01S 3/06791 |
| 2018/0341874 A1* | 11/2018 | Puri | G06N 10/40 |
| 2019/0156239 A1* | 5/2019 | Martinis | G06N 10/70 |
| 2021/0133614 A1* | 5/2021 | Ashrafi | G02F 3/00 |
| 2022/0014277 A1* | 1/2022 | Wang | G06N 10/40 |
| 2022/0075237 A1* | 3/2022 | Mittal | G02F 1/3526 |
| 2022/0076155 A1* | 3/2022 | MacFarlane | G06N 10/40 |
| 2022/0215281 A1* | 7/2022 | Englund | G06N 10/40 |
| 2022/0224996 A1* | 7/2022 | Nickerson | G06N 10/40 |
| 2022/0299839 A1* | 9/2022 | Jiang | G02B 6/12007 |
| 2022/0317544 A1* | 10/2022 | Reilly | H04B 10/70 |
| 2022/0357633 A1* | 11/2022 | Xia | G02F 1/3511 |
| 2023/0029063 A1* | 1/2023 | Pérez López | H03K 19/17728 |

(Continued)

OTHER PUBLICATIONS

Lu et al. (Chip-integrated visible-telecom photon pair sources for quantum communication, 2019, NIST, pp. 1-17) (Year: 2019).*

(Continued)

*Primary Examiner* — Iftekhar A Khan
(74) *Attorney, Agent, or Firm* — Sprinkle IP Law Group

(57) ABSTRACT

Embodiments of systems and methods for efficient photonic based quantum circuitry in a heralded system are disclosed. Embodiments may employ filters with a photon pair source to route photons to quantum circuit blocks in a quantum system. These quantum circuit blocks can process the photons routed to those quantum circuit blocks in the quantum system.

20 Claims, 6 Drawing Sheets

(56) References Cited

U.S. PATENT DOCUMENTS

2023/0040234 A1* 2/2023 Aspuru-Guzik ....... G06N 10/70
2023/0042201 A1* 2/2023 Raussendorf .......... G06E 3/001

OTHER PUBLICATIONS

Faruque et al. ( On-chip quantum interference with heralded photons from two independent micro-ring resonator sources in silicon photonics, vol. 26, No. 16 | Aug. 6, 2018 | Optics Express 20379, pp. 1-17) (Year: 2018).*

Harder et al. ( An optimized photon pair source for quantum circuits, Optics Express, 2013, pp. 13975-13985) (Year: 2013).*

* cited by examiner

SYSTEMS AND METHODS FOR EFFICIENT PHOTONIC HERALDED QUANTUM COMPUTING SYSTEMS

RELATED APPLICATIONS

This application claims a benefit of priority under 35 U.S.C. § 119 to U.S. Provisional Patent Application No. 63/075,369 filed Sep. 8, 2020, entitled "DUAL RAIL QUANTUM PHOTONIC CIRCUITRY," by Duncan L. MacFarlane et al, which is hereby fully incorporated by reference in its entirety.

TECHNICAL FIELD

This disclosure relates generally to quantum computing. In particular, this disclosure relates to architectures for efficient quantum circuitry. Even more specifically, this disclosure relates to embodiments of systems and methods for efficient photonic based quantum circuitry in a heralded system.

BACKGROUND

Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems, among others.

The fundamental unit of quantum information in a quantum computer is called a quantum bit, or qubit. Quantum computers can use a binary representation of numbers, just as conventional binary computers. In addition, quantum systems can also make us of use multi-valued logic and data, in which case, the atomic quantum datum is referred to as a "qudit". An individual qubit or qudit datum can be physically represented by the state of a quantum system. However, in a quantum system, the datum can be considered to be in more than one of the possible states at any single given time. Thus, in the case of a qubit, the datum can be in a state that represents both a zero and a one at the same time. This state is referred to as superposition. Quantum superpositions of this kind are fundamentally different from classical data representations, even when classical probabilities are taken into account. It is only when a quantum datum is observed that its value "collapses" into a well-defined, single state. This "collapse" occurs due to an intentional observation or measurement or it can occur due to environmental influences, referred to as decoherence.

Thus, while bits in the classical computing model always have a well-defined value (e.g., 0 or 1), qubits in superposition have some simultaneous probability of being in both of the two states representing 0 and 1. It is customary to represent the general state of a quantum system by $|\Psi\rangle$, and let $|0\rangle$ and $|1\rangle$ represent the quantum states corresponding to the values 0 and 1, respectively. Quantum mechanics allows superpositions of these two states, given by $$|\Psi\rangle = \alpha|0\rangle + \beta|1\rangle$$

where $\alpha$ and $\beta$ are complex numbers. In this case, the probability of observing the system in the state $|0\rangle$ is equal to $\alpha^2$ and the probability of the state $|1\rangle$ is $\beta^2$.

Quantum computers may utilize physical particles to represent or implement these qubits or qudits. One example is the spin of an electron, wherein the up or down spin can correspond to a 0, a 1, or a superposition of states in which the electron's spin is both up and down at the same time. Performing a calculation using the electron may essentially perform the operation simultaneously for both a 0 and a 1. Similarly, in a photonic approach to quantum computing, a "0" may be represented by the possibility of observing a single photon in a given path (or waveguide), whereas the potential for observing the same photon in a different path may represent a "1". Photons are excellent quantum information carriers because they combine high speed with long coherence times at room temperature. Accordingly, in many quantum informatic processing systems, one realization utilizes the quantum observables of a photon to encode information in units of quantum binary digits or qubits.

In such photonic based quantum computing systems, one means for determining an interval in time in which the photon can be located in a particular spatial interval is the implementation of a "heralded" system. A heralded system consists of two photons with a known temporal coincidence window wherein the first photon is referred to as the "signal" photon and the second photon is referred to as the "idler" photon (the idler photon may also be referred to as the "herald" or "trigger" photon, and such terms will be used interchangeably herein). To ensure that the (signal, idler/herald/trigger) photon pair is coincident within a particular pre-determined and temporal coincidence window, particular known physical processes are employed, depending on the system.

Problematically, however, such heralded systems are quite inefficient. In the main, these inefficiencies stem from the methodology used to produce a photon pair (coupled with the nature of quantum computing itself). In particular, most architectures for photonic based heralded quantum computing system can only make use of a photon pair produced from a source a fraction of the time such a pair is actually produced. As such, the computational efficiency of such quantum circuitry is severely compromised.

What is desired then, is to increase the computational efficiency photonic based quantum circuitry, including the use of such photonic based quantum circuitry in a heralded system.

SUMMARY

To continue with the above discussion, as may be recalled a photonics based heralded quantum computing system utilizes a pair of photons referred to as the signal photon and the herald photon. As will be discussed in more detail, it is desirable that there be a difference in an attribute of the signal photon and the herald photon, such that they can be differentiated and utilized appropriately in the quantum computing system. To generate such photon pairs, a ring resonator may be employed. A generic ring resonator consists of an optical waveguide that is looped back on itself, such that a resonance occurs when the optical path length of the resonator is exactly a whole number of wavelengths. Ring resonators therefore support multiple resonances, and the spacing between these resonances, the free spectral range (FSR), depends on the resonator length. By utilizing particular types or configurations of ring resonators, such as dual rail ring resonators having certain attributes, in combination with certain photon sources, or couplings of photon sources to the ring resonators, signal and herald photon pairs with a differentiating attribute (e.g., wavelength) may be produced by these ring resonator structures. Such ring resonator structures that produce photon pairs of different wavelengths are referred to as wavelength converters (WC or WCC).

There are a number of different methods by which such WCC structures may be constructed, but two common architectures are shown in FIGS. 1A and 1B. The first of these (FIG. 1A) is known as a single-rail system and the form that is shown in FIG. 1B is referred to as a dual-rail system. In a single-rail system, a "source" photon may be injected into the structure by means of waveguide 130a through port A 140a after which that photon may be coupled into resonator ring 120a or it may continue to travel through the waveguide and exit the structure by means of port B 150a. If the injected photon is coupled into resonant ring 120a, then, after traveling around resonant ring 120a, the photon may then either be absorbed by one of the atoms in the resonant ring 120a or it may continue traveling around the ring or it may be coupled out of the resonant ring 120a and back into waveguide 130a. If it is assumed that the probability of a given photon being absorbed is negligible (referred to as a "non-dispersive" case), then at some point after a photon enters the single-rail structure from port A 140a, that photon must eventually exit the structure by port B 150a.

Thus, the theoretical maximum efficiency of the (non-dispersive) single-rail system is unity, but only if the scenario is considered where the photon never enters the ring as an equally valid event to one where the photon travels through the ring at least once. If those two scenarios can be differentiated, then there exist two possible options: one where the photon exiting the system at port B 150a has never entered the resonant ring 120a and another, where the exiting photon has transited through the ring at least once. However, the (theoretical maximum) probability of both options still sum to 100% in the non-dispersive case. If it is further assumed that the probability of a photon transiting across the coupling gap 130a is 50%, then the theoretical maximum probability of each option would be 50% in this (distinguishable) case.

In a (WCC) design used in embodiments, a pair of photons traveling through the resonant ring can interact and undergo frequency (or wavelength) conversion, due to nonlinear effect interaction between the two photons and the ring structure. In this WCC situation, it is then possible to distinguish the frequency-converted photons from the non-frequency-converted photons (e.g. using other resonant ring structures as highly frequency-selective filters). However, in this (distinguishable and non-dispersive) case, all photons that enter the system through port A 140a still must exit through port B 150a. Thus, the theoretical maximum probability of all possible outcomes must still all sum to 100% for this single-rail structure.

If the "dual-rail" structure shown in FIG. 1B is considered, there are two possible paths by which a photon injected into the system at port A 140b may exit; either port B 150b or port C 170b. In the theoretical (non-dispersive, distinguishable) case, the probability of a photon exiting from either port is then cut in half for each possible exit. As stated before, in a non-dispersive system, the total probability of a photon exiting either port B 150b or port C 170b must sum to 100%. Assuming that the resonant ring to waveguide coupling constants (145b at structure 130b and 175b at structure 160b) are roughly equal, then the probability of an injected photon existing the structure out of port B 150b and port C 170b are still not equal. This is due to the scenario where a photon entering the system at port A 140b never enters the resonant ring 120b and simply continues on through to exit the dual-rail system at port B 150b. Thus, in a system where the coupling constants (145b and 175b) experienced by a photon at structures 130b and 160b, respectively, are roughly equal, the probability of detecting a photon at port B 150b and port C 170b are unequal. However, in a non-dispersive system, these unequal theoretical probabilities will still add up to 100%.

In addition, the nonlinear interaction that causes the frequency (or wavelength) conversion will result in the generation of pairs of photons that are entangled in time. In other words, if one photon of the pair (referred to as the "idler" or "herald" photon) is detected, then it is known a-priori that there must also be a corresponding "signal" photon somewhere in the system. A quantum computing system can then make use of such photon pairs generated by sources such as embodiments including a WCC structure in performing quantum computing tasks.

However, because of the architecture of ring resonators used for such photon pair sources, the quantum circuitry designed to utilize such photon pairs may only be able to make use of a generated photon pair a fraction of the times such a photon pair is produced. For example, consider a WCC employing a dual-rail single source ring resonator structure with the quantum circuitry coupled to an output port of the WCC. In this case, the quantum circuitry may only be able to utilize a generated photon pair at best 50 percent of the time. This may be due to the fact that there are two possible exit paths for photons in the non-dispersive system; port B 150b and port C 170b. However, the case where both the herald and the signal photons exit the system from the same port should also be considered. To illustrate, a WCC of this configuration may have four ports, with a photon source (e.g., a photon pump, laser, etc.) coupled to one of the ports of the WCC. The photons of the photon pair (again, herald and signal) generated from the WCC may thus appear on the output ports of the dual rail WCC with substantially equal probability (e.g., they may both appear on a single output port or they may appear on different output ports of the WCC). If the quantum circuitry is dependent on detecting the herald photon but not the signal photon and it is coupled to only one of those ports, such quantum circuitry may receive and make use of the photon pair at best 33.3% of the time under ideal conditions. As can be seen, this arrangement is computationally inefficient.

Accordingly, to increase the computational efficiency of photonic based quantum heralded systems embodiments may couple quantum circuitry (referred to generally as quantum circuitry blocks) to multiple output ports of the photon pair source in such quantum systems. These quantum circuitry blocks may be identical or they may implement different functionality. While such a multiple-block architecture may utilize a larger amount of physical space (e.g., chip real estate) than single-block quantum systems, they may achieve a substantial increase in efficiency as all of the potential output ports of the WCC may be used. For example, in cases where the quantum circuitry coupled to each output port of a WCC is identical, the computational efficiency of such a quantum system may be increased to around 50%, as the photon pairs produced by the photon pair source may be utilized at either of the quantum circuitry blocks (or downstream quantum circuitry) when that quantum circuitry block receives the photons of the photon pair. The resulting efficiency gain is affected by the probability that the herald and signal photons can be used no matter which exit path they take, so the theoretical maximum efficiency is then dependent on whether or not the two photons exit from the same port.

Moreover, embodiments may additionally employ the use of filters at each of the output ports of the photon pair source to further increase computational efficiency. In a particular embodiment, a filter, such as a photonic filter that can separate photons based on wavelength, may be disposed between the photon pair source and the quantum circuitry block on each output port of the photon pair source, such that the respective output port of the photon pair source is provided as an input to the corresponding filter on that output port. As the filters may be able to differentiate a received herald photon from a received signal photon, each filter may have a herald output and a signal output. Accordingly, if a herald photon (e.g., a photon having a particular wavelength associated with a herald photon) is received at that filter it may be routed to the herald output of that filter while if a signal photon (e.g., a photon having a particular wavelength associated with a signal photon) is received at the input of the filter it may be routed to the signal output of that filter (in the case where both a herald photon and a signal photon is received at that filter on the output port of the photon pair source, the herald photon is routed to the herald output and the signal photon is routed to the signal output).

The signal output of each filter may thus be provided to the associated quantum circuit block on the output port of the photon pair source, such that if a signal photon is received by the filter on the output port of the photon pair source it is provided on the signal output of the filter to the (signal input of) the quantum circuit block on that output port. The herald outputs of each of the filters may be provided to one or more detectors (also referred to as a detector stack) adapted to detect the output (the output vector) of each of the quantum circuitry blocks coupled to each of the output ports of the photon pair sources.

In this manner, if the herald photon and signal photon are split (e.g., appear on different output ports of the photon pair source), quantum computation may still take place as the quantum circuit on the output port on which the signal photon was produced may receive the signal photon from the filter on that output port and perform quantum processing using that signal photon while the output of that quantum circuit block may be detected (e.g., at the appropriate time) using a detector stack triggered by the herald photon provided on the herald output of the filter on the other output port of the photon pair source (e.g., the output port on which the herald photon was produced). As such, the computational efficiency of such a quantum system may be increased to a theoretical maximum of 100% (assuming non-dispersive operation), as the photon pairs produced by the photon pair source may be utilized at either of the quantum circuitry blocks substantially regardless of the output port of the photon source on which each of the photon pair was produced.

While certain embodiments may route the herald output of the filters on each output port of the photon pair source to a detector stack, in other embodiments the herald outputs of one or more of the filters on the output ports of the photon pair source may also be routed to quantum circuitry blocks. Such embodiments may be especially useful if it is desired to coordinate the operation of, or the transfer of information between, quantum circuitry blocks that are located remotely from one another (e.g., on different parts of a chip, different areas of a computing system, different cities, etc.). Specifically, as was mentioned earlier, an artifact of the physics of the generation of the photon pair (e.g., the conservation of energy), causes the herald and signal photons of a photon pair to be entangled in time, as they are produced at substantially exactly the same moment in time. As such, if a herald photon of photon pair is provided to one quantum circuitry block while the signal photon of the same photon pair is provided to another quantum circuitry block the entanglement in time of the two photons of the pair may be utilized to transfer information between quantum circuit blocks (e.g., to perform signaling, teleportation or transfer of state by sensing the decoherence of a photon of the photon pair).

For example, in one embodiment, a filter may be disposed between the photon pair source and the quantum circuitry block on each output port of the photon pair source such that the respective output port of the photon pair source is provided as an input to the corresponding filter on that output port. Each filter may have a herald output and a signal output as discussed. If a herald is received at that filter it may be routed to the herald output of that filter, if a signal photon is received at the input of the filter it may be routed to the signal output of that filter, and if both a herald photon and a signal photon is received at that filter on the output port of the photon pair source, the herald photon is routed to the herald output and the signal photon is routed to the signal output.

The signal output of each filter may thus be provided to the associated quantum circuit block on the output port of the photon pair source, such that if a signal photon is received by the filter on the output port of the photon pair source it is provided on the signal output of the filter to the (signal input of) the quantum circuit block on that output port. In these types of embodiments, one or more of the herald outputs of each of the filters may be provided to separate quantum circuitry blocks. For example, a herald output of one filter may be provided to a quantum circuit block while the herald output of another filter may be provided to a detector stack to detect the output (the output vector) of the quantum circuitry blocks. Alternatively, in other embodiments, each of the herald outputs of each filter may be provided to a quantum circuit blocks such that the photon pair may coordinate the operation of the respective quantum circuit blocks to which they are provided. Here, as can be seen, theoretical computational efficiency is increased to around 100% (again under ideal conditions), as some type of quantum processing can be performed by one or more of the quantum circuitry blocks using the photon pair produced by the photon pair source each time such a photon pair is produced.

As can be understood then, embodiments may substantially increase the computational efficiency of heralded quantum computing systems with respect to usage of photon pairs produced by a photon pair source by allowing some form of quantum processing to occur for each photon pair produced by the photon pair source. However, other sources of computational inefficiencies and other impediments to successful quantum computer remain in such quantum systems. As one instance of such additional problems, as has been discussed a detector stack (e.g., photodetectors) may be used to detect the output (e.g., a photon) of a quantum circuitry block. These detectors are, however, not infallible. They can exhibit anomalous readings, known as "dark counts", whereby the detector registers a count without an incident photon. In other situations, the detector may not register an event, even if a photon is actually present. These "non-detected" events represent a decreased sensitivity (or efficiency) for the detector. In particular, as it may be desired to detect the presence of single photons on the output of quantum circuitry, many quantum computing systems may increase the efficiency of such detectors by boosting the detector bias voltage. But this boosting of the voltage also increases the sensitivity of the detectors to noise from external sources, such as leakage through the quantum circuitry itself or by stray cosmic ray particles transiting the system, thus increasing the detector's dark count.

It is thus desirable to decrease this dark count by photodetectors by blocking input to the detectors until such a time when a photon is expected or may otherwise need to be detected. Accordingly, embodiments of quantum systems as used herein may utilize a modulator disposed on the output of the quantum circuitry between the quantum circuitry and the detector stack adapted to detect the presence of photons on the output of the quantum circuitry. The modulators and detectors may, for example, be integrated on a chip including such quantum circuitry. These modulators may be optical modulators adapted to be gated to block light or to be transparent. Thus, these modulators may be utilized to block stray light from the detector stack during an interval of time when a photon is not expected or scheduled to arrive. The modulators can then be gated to be transparent when it is desired for the detector to measurement photons on the output of the quantum circuitry.

For example, in one embodiment, the modulators may be coupled to the photon source of the quantum system such that they can be gated to be open (transparent) based on the output of the photon source for the quantum system, so these modulators are opened only when the photon source produces a photon. The modulators can then be closed (gated to block light) at some time after the photon source produces a photon. In one embodiment, for example a timing function with a probabilistic exponential tail based on the type of photon source or design of quantum system or quantum circuits therein may be utilized such that the timing function may be employed to close the modulators at a time after a photon is emitted by the photon source. In this manner faster and more reliable measurements may be made in quantum systems, increasing the efficiency of the quantum systems by increasing the reliability, and thus the usefulness of the output of the detectors of the quantum system.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1A:
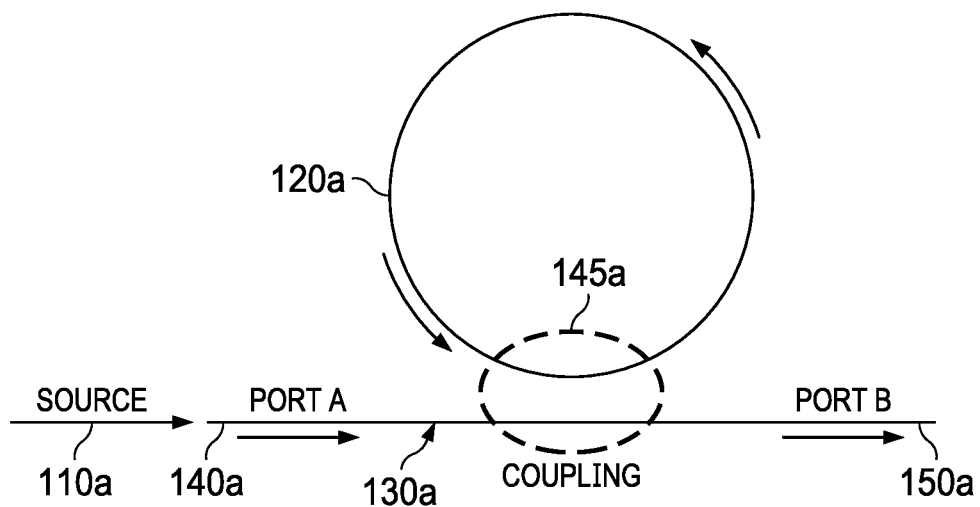
FIG. 1A is a block diagram of a ring resonator with a single rail and a single source.

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. As may be recalled from the above discussions, quantum computers may utilize physical particles to represent or implement qubits or qudits. Photons are excellent quantum information carriers because they combine high speed with long coherence times at room temperature. In a photonic approach to quantum computing, a "0" may be represented by the possibility of observing a single photon in a given path, whereas the potential for observing the same photon in a different path may represent a "1". Accordingly, in many quantum informatic processing systems photons may be used to encode the quantum data.

In such photonic based quantum computing systems, one means for determining an interval in time in which the photon can be located in a particular spatial interval is the implementation of a "heralded" system. A heralded system consists of two photons with a known temporal coincidence window wherein the first photon is referred to as the signal photon and the second photon is referred to as the herald photon. Such heralded systems can be quite inefficient. For example, most architectures for photonic based heralded quantum computing system can only make use of a photon pair produced from a source a fraction of the time such a pair is actually produced. As such the computational efficiency of such quantum circuitry is severely compromised.

Specifically, to generate such photon pairs, a ring resonator may be employed. By utilizing particular types or configurations of ring resonators, such as dual rail ring resonators having certain attributes, in combination with certain photon sources, or couplings of photon sources to the ring resonators, signal and herald photon pairs with a differentiating attribute (e.g., wavelength) may be produced by these ring resonator structures. Such ring resonator structures that produce photon pairs of different wavelengths are referred to as wavelength converters (WCC). Quantum circuitry of the quantum computing system can then make use of such photon pairs generated by photon pair sources in performing quantum computing.

To elaborate in more detail, as is well known to those skilled in the art, certain of the said physical processes exploit the dielectric polarization density P, hereafter referred to as simply the "polarity" of a material due to the presence of light with an electric field vector E. P is a vector that is a complex function of the electric field E that is defined as the total dipole moment per unit volume of a particular material due to the presence of an electric field E. P can be expressed in terms of the permittivity of free space, $\varepsilon_0$, the applied electric vector field E, and the electric susceptibility of the material, $\chi = \varepsilon_r - 1$, where $\varepsilon_r$ is the relative permittivity of the material. In general, the electric susceptibility of a material, $\chi$, is a tensor although in the special case of a homogenous, linear, non-dispersive, and isotropic material, $\chi$ simplifies to a scalar.

The said physical processes of interest exploit the electric susceptibility of non-linear materials wherein the polarization density responds in a non-linear manner with respect to the electric field E. In such non-linear materials, the polarization density P can be expressed with $m^{th}$-ordered terms of electric susceptibility, $\chi^{(m)}$. In the general case, the first-ordered susceptibility term is in the form of a tensor of rank two with dimension 3×3 since the dielectric material has three spatial dimensions. Higher-ordered susceptibilities are tensors of rank m+1 with units of (meters/volt)$^{(m-1)}$. Thus, $\chi^{(2)}$ is a third-rank tensor comprising 27 elements with units of (m/V) and $\chi^{(3)}$ is a fourth-rank tensor comprising 81 elements with units of (m/V)$^2$. In the form of a Taylor's series expansion, the polarity P of a material due to a time-varying electric field E(t) is expressed as $$P = \varepsilon_0 [\chi^{(1)} E(t) + \chi^{(2)} E^2(t) + \chi^{(3)} E^3(t) + \chi^{(4)} E^4(t) + \ldots]$$

A first particular physical process that enables heralded systems employs the use of the principle of "spontaneous parametric down conversion" (SPDC). The SPDC process may employ a nonlinear optical material, often a crystal, to effect time coincident generation of a signal photon and corresponding idler photon as products of a nonlinear optical process. SPDC occurs due to the non-zero second-order electric susceptibility term, $\chi^{(2)}$, of the dielectric polarization P for a non-linear material. SPDC utilizes a single incident photon under phase matching conditions, referred to here as the "pump" photon that is characterized by a frequency, $f_{pump}$. The pump photon with frequency, $\omega_{pump}$, is incident to a nonlinear optical material that can spontaneously convert the single pump photon energy into a (signal, idler/trigger/herald) pair of temporal coincident photons with each having a frequency of $\omega_{signal}$ and $\omega_{idler}$ respectively wherein $\omega_{pump} = \omega_{signal} + \omega_{idler}$. Because the $\chi^{(2)}$ non-linear effects are nearly instantaneous, the detection of one of the said created pair can herald the generation of the other.

A second particular physical process that enables heralded systems employs the use of the principle of "spontaneous four-wave mixing" (SFWM). The SFWM process may employ a structure that serves as a resonant cavity with a corresponding "quality factor" denoted by Q. A plurality of resonant cavity structures are known to those skilled in the art. SFWM occurs due to the non-zero third-order electric susceptibility term, $\chi^{(3)}$, of the dielectric polarization P of the cavity material. It is noted that cavities comprised of isotropic materials, such as silica glass, have zero-valued $\chi^{(2)}$ terms, thus the non-linear response of such materials is dominated by the non-zero $\chi^{(3)}$ terms. One such resonant cavity structure is the "ring resonator." Within an appropriate structure or medium, SFWM can be regarded as the virtual absorption to two pump photons of frequency $\omega_{1pump}$ and $\omega_{2pump}$ with appropriate phase matching conditions resulting in the spontaneous creation of a (signal, herald) pair. Because the $\chi^{(3)}$ non-linear effects are nearly instantaneous, the detection of one of the said created pair can herald the generation of the other. Due to the mixing relationship, the frequencies of the two pump photons and those of the resulting (signal, herald) pair are related as $\omega_{1pump} + \omega_{2pump} = \omega_{signal} + \omega_{idler}$.

As discussed, in herald systems it is desirable that the signal and the herald photons have a property that is different between them that allows one to be distinguished from the other, and, further, to route one of the photons differently than the other. One example of such a property is to enable slight deviations in the phase matching criterion resulting in slight predictable deviations in wavelength of the spontaneously generated (signal, herald) pairs as compared to the wavelengths of the two pump photons. The predictable wavelength deviations of a (signal, herald) heralded pair enables the use of SFWM to generate a signal photon at a first wavelength that is time coincident with a herald photon at a second wavelength, wherein the first wavelength of the signal photon differs from the second wavelength of the idler photon.

Embodiments may make use of this property to utilize a photonic filter to demultiplex the signal photon at the first wavelength from the idler photon at a second wavelength and route the signal photon to different components from the idler photon. Such routing may be used to increase the computational efficiency of photonic based quantum heralded systems. Specifically, embodiments may couple quantum circuitry (referred to generally as quantum circuitry blocks) to multiple output ports of the photon pair source (e.g., the WCC) in such quantum systems. These quantum circuitry blocks may be identical or may perform different functionality. While such an architecture may utilize a larger amount of physical space (e.g., chip real estate) for such quantum systems, they may achieve a substantial increase in efficiency as one or the other of the quantum circuitry blocks may perform processing in certain circumstances. For example, in cases where the quantum circuitry coupled to each output port of a WCC is identical, the computational efficiency of such a quantum system may be increased to around 50%, as the photon pairs produced by the photon pair source may be utilized at either of the quantum circuitry blocks (or downstream quantum circuitry) when that quantum circuitry block receives the photons of the photon pair.

Moreover, embodiments may additionally employ the use of filters at each of the output ports of the photon pair source to further increase computational efficiency. In a particular embodiment, a filter, such as a photonic filter that can separate (e.g., demultiplex) photons based on wavelength, may be disposed between the photon pair source and the quantum circuitry block on each output port of the photon pair source such that the respective output port of the photon pair source is provided as an input to the corresponding filter on that output port. As the filters may be able to differentiate a received herald photon from a received signal photon, each filter may have a herald output and a signal output. Accordingly, if a herald photon (e.g., a photon having a particular wavelength associated with a herald photon) is received at that filter it may be routed to the herald output of that filter while if a signal photon (e.g., a photon having a particular wavelength associated with a signal photon) is received at the input of the filter it may be routed to the signal output of that filter (in the case where both a herald photon and a signal photon is received at that filter on the output port of the photon pair source, the herald photon is routed to the herald output and the signal photon is routed to the signal output).

The signal output of each filter may thus be provided to the associated quantum circuit block on the output port of the photon pair source, such that if a signal photon is received by the filter on the output port of the photon pair source it is provided on the signal output of the filter to the (signal input of) the quantum circuit block on that output port. The herald outputs of each of the filters may be provided to one or more detectors (also referred to as a detector stack) adapted to detect the output (the output vector) of each of the quantum circuitry blocks coupled to each of the output ports of the photon pair sources.

In this manner, if the herald photon and signal photon are split (e.g., appear on different output ports of the photon pair source), quantum computation may still take place as the quantum circuit on the output port on which the signal photon was produced may receive the signal photon from the filter on that output port and perform quantum processing using that signal photon while the output of that quantum circuit block may be detected (e.g., at the appropriate time) using a detector stack triggered by the herald photon provided on the herald output of the filter on the other output port of the photon pair source (e.g., the output port on which the herald photon was produced). As such, the theoretical maximum computational efficiency of such a quantum system may be increased to around 100% under certain conditions, as the photon pairs produced by the photon pair source may be utilized at either of the quantum circuitry blocks substantially regardless of the output port of the photon source on which each of the photon pair was produced.

It may now be useful to discuss examples of WCCs that may be utilized as photon pair sources in various embodiments. Turning first to FIG. 1A, a photonic circuit comprised of source 110a, ring 120a, and single rail 130a is depicted. Such a photonic circuit may be a single rail single source ring resonator that may be used as a WCC. (Photon) source 110a is coupled to rail 130a at Port A 140a and provides single photons with appropriate phase matching conditions into rail 130a at Port A 140a. The coupled source photons propagate in the direction of Port B 150a. A region of circuit 100a is indicated by coupling region 145a that is representative of the portion of circuit 100a where evanescent coupling occurs between ring 120a and rail 130a. Some fraction of the source photons present in rail 130a couple from the rail into ring 120a and the remaining fraction of source photons in rail 130a continue to propagate in rail 130a and exit the rail at Port B 150a.

Of the fraction of photons that are coupled into ring 120a some further fraction undergo a spontaneous physical process, such as a SFWM process, as they propagate through ring 120a. Of the total amount of photons circulating in the ring 120a, with some fraction having undergone a spontaneous physical process and the remainder not undergoing a spontaneous physical process, yet another fraction are coupled back into the single rail 130a in the coupling region 145a and propagate towards Port B 150a.

Figure 1B:
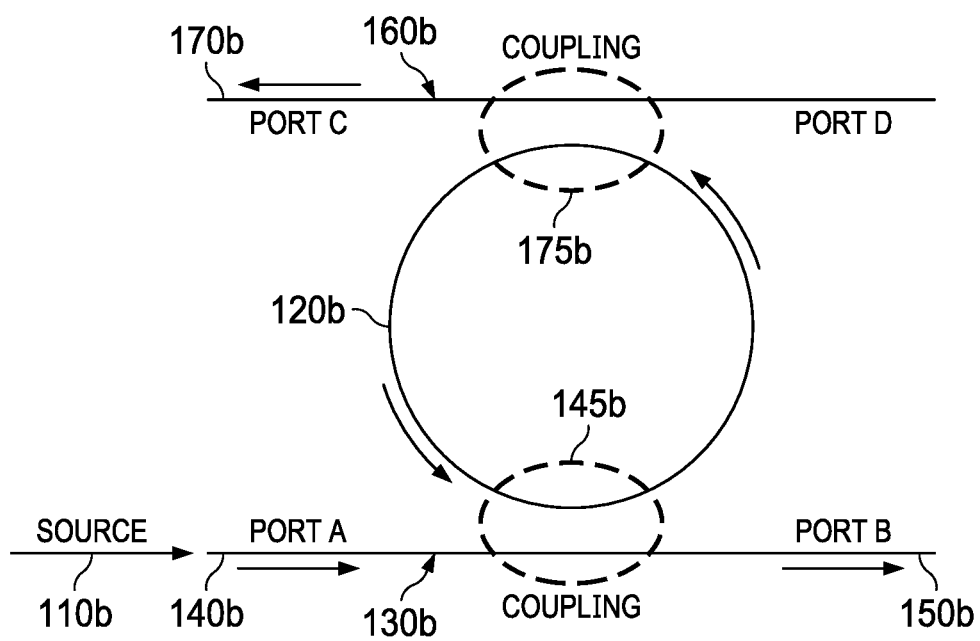
FIG. 1B is a block diagram of a ring resonator with dual rails and a single source.

Moving now to FIG. 1B, a photonic circuit comprised of source 110b, ring 120b, rail 130b, and rail 160b is depicted. Such a photonic circuit may be a dual rail single source ring resonator that may be used as a WCC. Source 110b provides single photons with appropriate phase matching conditions that are coupled into rail 130b at Port A 140b. The coupled source photons propagate in the direction of Port B 150b. A region of circuit 100b is indicated by a coupling region 145b that is representative of the portion of circuit 100b where evanescent coupling occurs among ring 120b and rail 130b. Some fraction of the source photons present in rail 130b couple from the rail into ring 120b and the remaining fraction of source photons in rail 130b continue to propagate in rail 130b and exit the rail at Port B 150b.

Of the fraction of photons that are coupled into ring 120b some further fraction undergo a spontaneous physical process, such as a SFWM process, as they propagate through ring 120b. Of the total amount of photons circulating in the ring 120b, with some fraction having undergone a spontaneous physical process and the remainder not undergoing a spontaneous physical process, yet another fraction are coupled back into the rail 130b in the coupling region 145b, another fraction are coupled back into rail 160b in the coupling region 175b, and the remainder continue to circulate in ring 120b. Those photons that are coupled to rail 130b at coupling point 145b propagate towards Port B 150b. Those photons that are coupled to rail 160b at coupling region 175b propagate towards Port C 170b.

It is noted with respect to FIGS. 1A and 1B that the sources 110a and 110b may be the output of a single source or two (or more) combined sources. Combining multiple sources to couple to the same port of the circuits of FIG. 1A or 1B can be desirable in particular applications for a plurality of reasons as will be understood by those of skill in the art. As a first example, it may be desirable to combine one source that is in the form of a pulsed laser and another source as an external pumping laser to produce a composite pumped pulsed source for use in the classical domain. As a second example, it may be desirable to combine two sources that generate photons of different frequencies as input to a single port to control physical processes such as SFWM that may occur within circuits 100a or 100b.

Figure 2A:
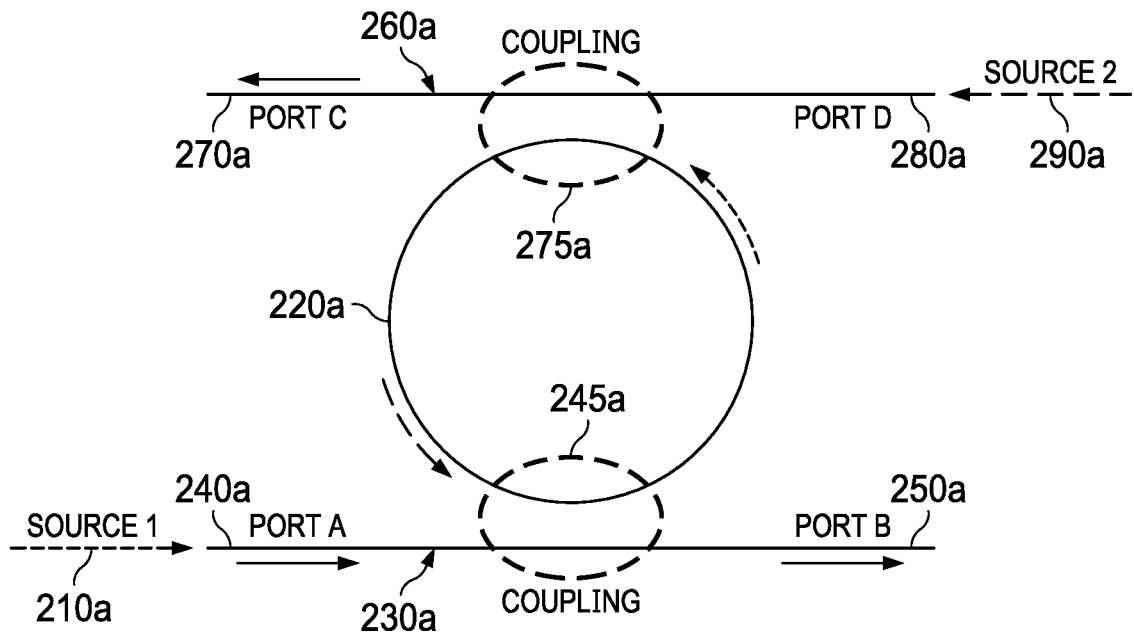
FIG. 2A is a block diagram of a ring resonator with dual rails and dual sources.
Figure 2B:
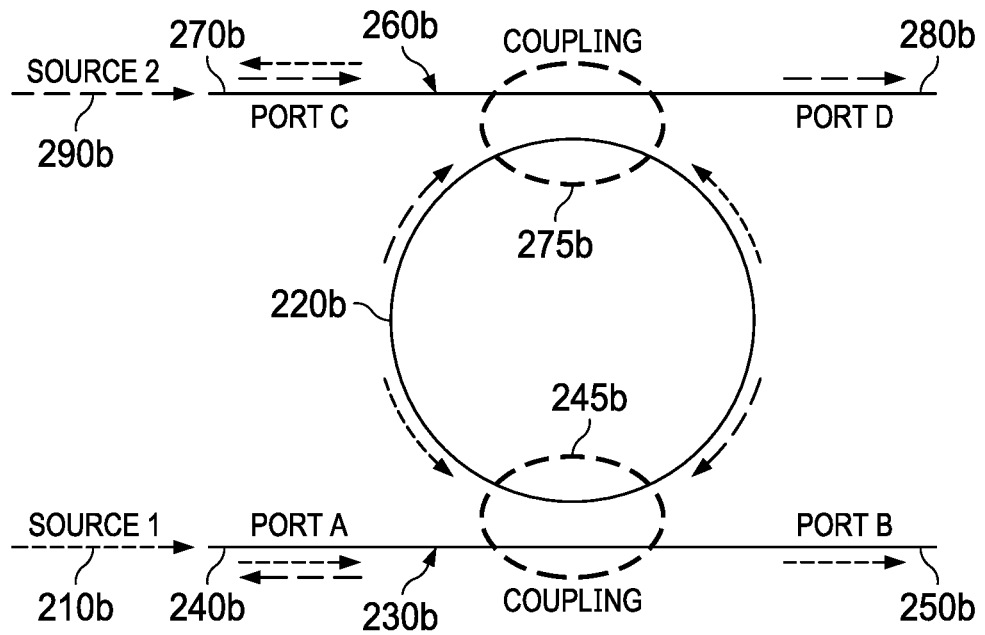
FIG. 2B is a block diagram of a ring resonator with dual rails and dual sources.

In certain examples of WCCs, two sources may also be coupled to a dual rail ring circuit wherein the two sources are coupled to each of two different rails. Examples of such WCCs are depicted in FIGS. 2A and 2B. FIG. 2A depicts a photonic circuit comprised of first source 210a, second source 290a, ring 220a, rail 230a, and rail 260a. Such a photonic circuit may be a dual rail dual source ring resonator that may be used as a WCC. The first source 210a provides single photons with appropriate phase matching conditions at Port A 240a that is coupled into rail 230a. The second source 290a provides single photons with appropriate phase matching conditions at Port D 280a that is coupled into rail 260a. The coupled photons from first source 210a propagate along rail 230a in the direction of Port B 250a and the coupled photons from second source 290a likewise propagate along rail 260a in the direction of Port C 270a.

A first region of the circuit is indicated by coupling region 245a is the portion of the circuit where evanescent coupling occurs among ring 220a and rail 230a. Some fraction of the source photons present in rail 230a couple from the rail into ring 220a and the remaining fraction of source photons in rail 230a continue to propagate in rail 230a and exit the rail at Port B 250a. Likewise, a second region of the photonic circuit is indicated by coupling region 275a that is the portion of the circuit where evanescent coupling occurs among ring 220a and rail 260a. Some fraction of the source photons present in rail 260a couple from the rail into ring 220a and the remaining fraction of source photons in rail 260a continue to propagate in rail 260a and exit the rail at Port C 270a.

Of the fraction of photons that are coupled into ring 220a at coupling region 245a, some further fraction undergo a spontaneous physical process, such as a SFWM process as they propagate through ring 220a. Likewise, of the fraction of photons that are coupled into ring 220a at coupling region 275a, some further fraction undergo a spontaneous physical process, such as a SFWM process, as they propagate through ring 220a. Of the total amount of photons circulating in the ring 220a due to coupling regions 245a and 275a with some further fraction having undergone a spontaneous physical process and the remainder not undergoing a spontaneous physical process, yet another fraction are coupled back into the single rails 230a in the coupling region 245a and yet another fraction are coupled back into the single rail 260a in the coupling region 275a, and the remainder continue to circulate in ring 220a. In the photonic circuit, the photons circulating in ring 220a that entered the ring through coupling region 245a propagate in the same direction as those photons in ring 220a that entered the ring through coupling region 275a.

It will be appreciated that the process of photons coupling from the rails 230a and 260a into ring 220a as well as the process of photons coupling from ring 220a back into rails 230a and 260a is a weakly random process that is influenced in a deterministic manner through the design of the coupling coefficients and that is furthermore randomly influenced due to the quantum nature of the total internal frustrated reflection (TIFR) coupling among rails 230a and 260a with ring 220a at coupling regions 245b and 275b where TIFR is the quantum photonic analog of quantum tunneling. Thus, there is some probability that photons exiting either Port C 270a or Port B 250a will have originated from first source 210a or second source 290a. Furthermore, there is some probability that exiting photons at Port B 250a or Port C 270a will have been spontaneously converted in ring 220a due to a physical process such as SFWM from photons originating from the first source 210a or the second source 290a.

FIG. 2B depicts a photonic circuit comprised of first source 210b, second source 290b, ring 220b, rail 230b, and rail 260b. The first source 210b provides single photons with appropriate phase matching conditions at Port A 240b that is coupled to rail 230b. The second source 290b provides single photons with appropriate phase matching conditions at Port C 270b that are coupled into rail 260b. The coupled photons from first source 210b propagate along rail 230b in the direction of Port B 250b and the coupled photons from second source 290b likewise propagate along rail 260b in the direction of Port C 260a. A first region of the circuit is indicated by coupling region 245b that is the portion of the circuit where evanescent coupling occurs among ring 220b and rail 230b. Some fraction of the source photons present in rail 230b couple from the rail into ring 220b and the remaining fraction of source photons in rail 230b continue to propagate in rail 230b and exit the rail at Port B 250b. Likewise, a second region of the circuit is indicated by shaded region 275b that is the portion of the circuit where evanescent coupling occurs among ring 220b and rail 260b. Some fraction of the source photons present in rail 260b couple from the rail into ring 220b and the remaining fraction of source photons in rail 260b continue to propagate in rail 260b and exit the rail at Port D 280b.

Of the fraction of photons that are coupled into ring 220b at coupling region 245b, some further fraction undergo a spontaneous physical process, such as a SFWM process as they propagate through ring 220b. Likewise, of the fraction of photons that are coupled into ring 220b at coupling region 275b, some further fraction undergo a spontaneous physical process, such as a SFWM process as they propagate through ring 220b. Of the total amount of photons circulating in the ring due to coupling regions 245b and 275b with some further fraction having undergone a spontaneous physical process and the remainder not undergoing a spontaneous physical process, yet another fraction are coupled back into the single rail 230b in the coupling region 245b and yet another fraction are coupled back into the single rail 260b in the coupling region 275b, and the remainder continue to circulate in ring 220b. In the circuit of FIG. 2B, the photons circulating in ring 220b that entered the ring through coupling region 245b propagate in an opposite direction as compared to those photons in ring 220b that entered the ring through coupling region 275b.

It will be understood that the process of photons coupling from the rails 230b and 260b into ring 220b as well as the process of photons coupling from ring 220b back into rails 230b and 260b is a weakly random process that is influenced in a deterministic manner through the design of the coupling coefficients and that is furthermore randomly influenced due to the quantum nature of the total internal frustrated reflection (TIFR) coupling among rails 230b and 260b with ring 220a at coupling regions 245b and 275b where TIFR is the quantum photonic analog of quantum tunneling. Because the photons in ring 220b circulate in opposite directions depending upon which source they originated from, or correspondingly, which source provided the photons that were spontaneously converted, a rail-based separation or filtering process results regarding the photons that exit the four Ports A, B, C, and D labeled as 240b, 250b, 270b, and 280b.

With regard to photons exiting Port A 240b, they may be due to photons originating from source 2 290b that were first coupled into ring 220b via coupling region 275b and secondly coupled into rail 230b via coupling region 245b. Likewise, photons exiting Port A 240b may be due to photons originating from source 2 290b that coupled to ring 220b via coupling region 275b wherein the said coupled photons undergo a physical process such as SFWM while they are circulating in ring 220b and then exit ring 220b due via coupling region 245b. Because Port A 240b serves as the entry port for photons produced by source 1 210b, those skilled-in-the-art will appreciate that some means for filtering and diverting photons exiting Port A 240b may be desirable to prevent them from propagating into the output portion of source 1 210b.

With regard to photons exiting Port B 250b, they may be due to photons originating from source 1 210b that were not coupled into ring 220b at coupling region 245b and instead continued to propagate along rail 230b until they reach Port B 250b. Some other portion of photons exiting Port B 250b may be due to photons originating from source 1 210b that were firstly coupled into ring 220b via coupling region 245b, circulated one or more times within ring 220b, secondly coupled into rail 230b via coupling region 245b, and then propagated along rail 230b to exit at Port B 250b. Yet another portion of photons exiting Port B 250b may be due to photons originating from source 1 210b that were firstly coupled into ring 220b via coupling region 245b, circulated one or more times within ring 220b, underwent a physical process such as SFWM producing new photons, where one or more of the said new photons secondly couples into rail 230b via coupling region 245b, and then where the one or more new photons propagates along rail 230b to exit at Port B 250b. It will be appreciated that photons exiting Port B 250b either originated from source 1 210b or are the result of a physical process such as SFWM that resulted from photons originating from source 1 210b wherein no photons exiting Port B 250b originated from source 2 290b or were the result of a physical process such as SFWM due to photons originating from source 2 290b.

With regard to photons exiting Port C 270*b*, they may be due to photons originating from source 1 210*b* that were first coupled into ring 220*b* via coupling region 245*b* and secondly coupled into rail 260*b* via coupling region 275*b*. Likewise, photons exiting Port C 270*b* may be due to photons originating from source 1 210*b* that coupled to ring 220*b* via coupling region 245*b* wherein the said coupled photons undergo a physical process such as SFWM while they are circulating in ring 220*b* and then exit ring 220*b* due via coupling region 275*b*. Because Port C 290*b* serves as the entry port for photons produced by source 2 290*b*, it will be appreciated that some means for filtering and diverting photons exiting Port C 270*b* may be desirable to prevent them from propagating into the output portion of source 2 290*b*.

With regard to photons exiting Port D 280*b*, they may be due to photons originating from source 2 290*b* that were not coupled into ring 220*b* at coupling region 275*b* and instead continued to propagate along rail 260*b* until they reach Port D 280*b*. Some other portion of photons exiting Port D 280*b* may be due to photons originating from source 2 290*b* that were firstly coupled into ring 220*b* via coupling region 275*b*, circulated one or more times within ring 220*b*, secondly coupled into rail 260*b* via coupling region 275*b*, and then propagated along rail 260*b* to exit at Port D 280*b*. Yet another portion of photons exiting Port D 280*b* may be due to photons originating from source 2 290*b* that were firstly coupled into ring 220*b* via coupling region 275*b*, circulated one or more times within ring 220*b*, underwent a physical process such as SFWM producing new photons, where one or more of the said new photons secondly couples into rail 260*b* via coupling region 275*b*, and then where the one or more said new photons propagates along rail 260*b* to exit at Port D 280*b*. It will be appreciated by those skilled-in-the-art that photons exiting Port D 280*b* either originated from source 2 290*b* or are the result of a physical process such as SFWM that resulted from photons originating from source 2 290*b*. Wherein no photons exiting Port D 280*b* originated from source 1 210*b* or were the result of a physical process such as SFWM due to photons originating from source 1 210*b*. Thus, there is some probability that photons exiting either Port C 270*a* or Port B 250*a* will have originated from first source 210*a* or second source 290*a*. Furthermore, there is some probability that exiting photons at Port B 250*a* or Port C 270*a* will have been spontaneously converted in ring 220*a* due to a physical process such as SFWM from photons originating from the first source 210*a* or the second source 290*a*.

It is again, noted that the sources 210*a*, 290*a*, 210*b*, and 290*b* may be construed as the output of a single source or two or more combined sources. In the case of two combined sources, the produced photon frequencies may be equivalent or they may differ depending upon the application of circuits 200*a* and 200*b* as is understood by those skilled-in-the-art. Combining multiple sources to couple to the same port of circuits 200*a* and 200*b* can be desirable in particular applications for a plurality of reasons. As a first example, it may be desirable to combine one source that is in the form of a pulsed laser and another source as an external pumping source that produces a composite pumped pulsed source that is coupled into a single port of the circuits of FIG. 2A or 2B. As a second example, it may be desirable to combine two sources that generate photons of different frequencies as input to a single port of circuits of FIG. 2A or 2B to control physical processes such as SFWM that may occur within the circuits of FIG. 2A or 2B.

Thus, circuits as described with respect to FIGS. 1A, 1B, 2A and 2B may serve as WCCs for a photon pair source in heralded quantum systems, where these circuits may, for example, satisfy appropriate phase matching and other necessary criteria to enable SFWM to occur. Embodiments as disclosed herein comprise quantum systems that include such WCCs coupled to quantum circuit blocks where such embodiments may utilize a photonic filter to demultiplex the signal photon at the first wavelength from the idler photon at a second wavelength and route the signal photon to different components from the idler photon. Such routing may be used to increase the computational efficiency of photonic based quantum heralded systems.

For example, quantum circuit blocks may be coupled to Ports A, B, C, and D (these quantum circuit blocks may be referred to as QC-A, QC-B, QC-C, and QC-D for purposes of discussion respectively). For example, with regards to an embodiment of a quantum system that utilizes a WCC as depicted in FIG. 2B, QC-A and QC-C may be comprised of quantum circuit blocks that have one-way couplers allowing sources 210*b* and 290*b* to couple into Ports A and C. Furthermore, QC-A and QC-C may include wavelength filters that cause the photons exiting Ports A and C to be diverted into external waveguides and used for further quantum processing. Wavelength filtering may be functional since the circuit parameters can be designed such that the spontaneously produced photons due to SFWM are wavelength dependent and differ from the original source photon wavelengths. It will be appreciated by one skilled in the art with respect to the depicted embodiments that higher order nonlinear optical processes may be used which will generate additional signal photons and these will provide a high number of inputs into the quantum circuit blocks.

In another embodiment, the augmented quantum circuit blocks contain wavelength filters and detectors that enable circuits 200*a* or 200*b* to serve as true random number generators. Because the spontaneously produced photons due to SFWM have different frequencies but can randomly exit one of the two available rails, one rail can be designated to represent a zero-valued bit and the other a one-valued bit. Detectors can be used to sense the presence of the photons in the quantum circuits at the ports and hence convert the sensed energy to electrical signals representing a zero or a one. Because the TIFR physical process is based on a natural probabilistic phenomenon, a quantum true random number generator results (QTRNG) results.

In the case of yet another embodiment, the signal photon interacts with a Hadamard gate and is thereby placed in superposition across two spatial states or locations. Upon readout or detection of the signal photon's location observable, the superimposed states of the signal photon collapse into a measurement basis state and the idler photon serves as a temporal trigger to allow correlation statistics to be beneficially used. Such example usages can include SNR improvement or verification of operation in the quantum regime.

An example of this is to use spontaneous four wave mixing to generate a signal photon at a first wavelength that is time coincident with an idler photon at a second wavelength that is different from the first wavelength of the signal photon. In this example, a photonic filter may be used to demultiplex the signal photon at the first wavelength from the idler photon at a second wavelength. Thus, the signal photon may be routed to different photonic components from the idler photon.

In regard to realizations in the form of a quantum photonic integrated circuit, the said wavelength conversion process may be realized with a structure referred to herein as a "ring resonator" designed to exhibit a relatively high quality factor, Q. The said high quality factor of the ring resonator enhances the spontaneous production of signal and idler photon pairs. The ring resonator is evanescently coupled to one or more waveguides that serve as input-output rails and characterized by a complex-valued coupling coefficient. Photons enter or exit the ring resonator via the one or more coupled waveguides which are also referred to by the term "rails" herein.

In a single-rail ring resonator wavelength converter, a single waveguide is coupled to the wavelength convertor ring and the output signal and idler photons exit into the single waveguide. If the wavelengths of the signal and idler photons are different, filters may be used in embodiments to route the signal photon and the idler photon to different photonic components.

Figure 3A:
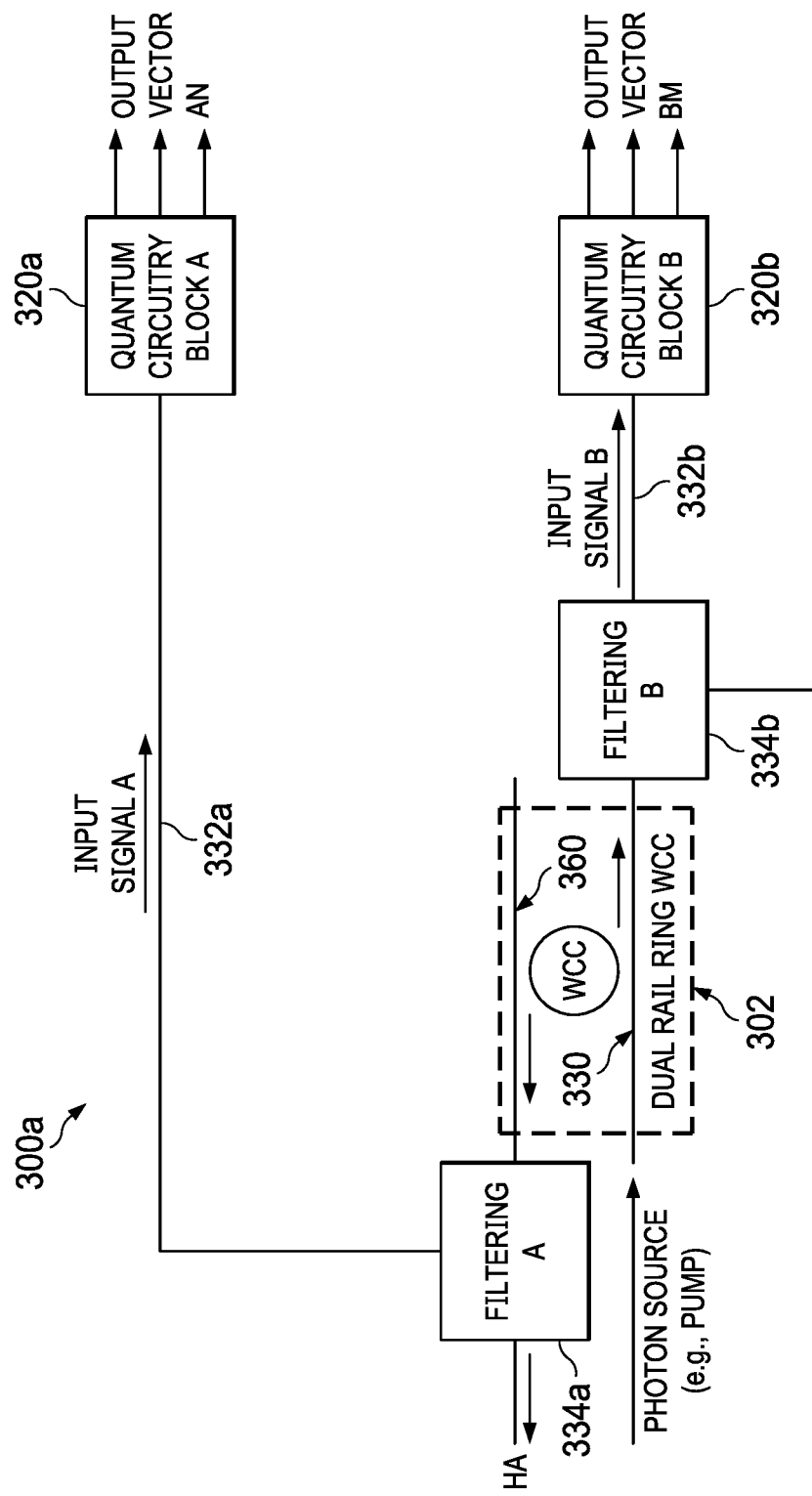
FIG. 3A is a block diagram of a quantum system according to one embodiment.

Referring now to FIG. 3A, one embodiment of a photonic heralded quantum system with increased efficiency is shown. Here, quantum system 300a may utilize a photon pair source 302 coupled to a photon source, where the photon pair source 302 comprises a WCC such as that depicted in FIG. 1B, where wavelength conversion may be realized using a ring resonator coupled to two waveguides (rails) 360, 330 (e.g., a dual-rail ring resonator). In this configuration, the photon pair source 302 may produce a photon pair including a signal photon and a herald photon that may have different wavelengths. The signal and herald photon may both exit top rail 360; or the signal and herald photon may both exit the bottom rail 330; or the signal and the herald may exit different rails 330, 360. For example, the signal photon may exit the top rail 360 and the herald photon may exit the bottom rail 330. Embodiments may make use of both rails 330, 360 in such a quantum system comprising a dual rail wavelength converter used as a photon pair source 302. It will be noted here that while embodiments herein may be described as utilizing a WCC, such as that depicted in FIG. 1B, as a photon pair source, other embodiments may utilize other implementations of WCCs, including those depicted herein, with similar efficacy.

If the signal photon and the herald photon can be differentiated (for example because the photons have different wavelengths or another property by which the photons may be differentiated, such as polarization), then one photon may be routed to serve as a herald, or trigger, and the other can feed a block of quantum circuitry. In particular, two quantum circuit blocks, quantum circuit block A 320a and quantum circuit block B 320b, are shown in FIG. 3A. These quantum circuit blocks 320a, 320b may the same, or may be different, quantum circuits (e.g., may comprise identical or different circuitry). Moreover, the quantum circuit blocks 320a, 320b may represent one or more chained blocks of quantum circuitry.

In the illustrated embodiment, rail 330 of the photon pair source 302 is coupled to filter 334b (e.g., a photonic filter that can differentiate photons based on wavelength), while rail 360 of photon pair source 302 is coupled to filter 334a. Filter 334a has two outputs (e.g., waveguides), a first output 332a for the signal photon that is coupled to quantum circuit block A 320a and a herald output HA. Similarly, filter 334b has two outputs (e.g., waveguides), a first output 332b for the signal photon that is coupled to the quantum circuit block B 320b and a herald output HB.

In quantum system 300a the photon designated as the herald (trigger) is routed accordingly using filters 334. The signal photon corresponding to the herald is input to a quantum circuit block. It will be appreciated by one skilled in the art that the terms signal and idler/herald/trigger, to denote the products of a nonlinear optical process are somewhat arbitrary and may be interchanged. It will also be appreciated by one skilled in the art that the signal can serve as the herald (trigger) temporal trigger and the herald can then be used as the input to a quantum circuit block 320. In quantum system 300a filters 330b provide independent outputs for the herald (trigger) regardless of which rail 330, 360 the herald (trigger) photon exits the photon pair source 302.

Thus, the use of filters 334 at each of the output ports of the photon pair source 302 may increase computational efficiency. As the filters 334 may be able to differentiate a received herald photon from a received signal photon, each filter 334 may have a herald output HA, HB and a signal output 332. Accordingly, if a herald photon (e.g., a photon having a particular wavelength associated with a herald photon) is received at that filter 334 it may be routed to the herald output HA, HB of that filter 334 while if a signal photon (e.g., a photon having a particular wavelength associated with a signal photon) is received at the input of the filter it may be routed to the signal output 332 of that filter 334 (in the case where both a herald photon and a signal photon is received at that filter 334 on the output port of the photon pair source 302, the herald photon is routed to the herald output HA, HB and the signal photon is routed to the signal output 332).

The signal output of each filter 334 may thus be provided to the associated quantum circuit block 320 on the output port of the photon pair source 302, such that if a signal photon is received by the filter 334 on the output port of the photon pair source 302 it is provided on the signal output 332 of the filter 334 to the (signal input of) the quantum circuit block 320 on that output port. The herald outputs HA, HB of each of the filters 334 may be provided to one or more detectors (also referred to as a detector stack) adapted to detect the output (the output vector) of each of the quantum circuitry blocks 320 coupled to each of the output ports of the photon pair sources 302.

In this manner, if the herald photon and signal photon are split (e.g., appear on different output ports of the photon pair source 302), quantum computation may still take place as the quantum circuit block 320 on the output port on which the signal photon was produced may receive the signal photon from the filter 334 on that output port and perform quantum processing using that signal photon while the output of that quantum circuit block 320 may be detected (e.g., at the appropriate time) using a detector stack triggered by the herald photon provided on the herald output of the filter on the other output port of the photon pair source (e.g., the output port on which the herald photon was produced). As such, the theoretical maximum computational efficiency of such a quantum system may be increased to around 100% under certain conditions, as the photon pairs produced by the photon pair source 302 may be utilized at either of the quantum circuitry blocks 320 substantially regardless of the output port of the photon pair source on which each of the photon pair was produced.

While certain embodiments may route the herald output of the filters on each output port of the photon pair source to a detector stack, in other embodiments the herald outputs of one or more of the filters on the output ports of the photon pair source may also be routed to quantum circuitry blocks. Such embodiments may be especially useful if it is desired to coordinate the operation of, or the transfer of information between, quantum circuitry blocks that are located remotely from one another (e.g., on different parts of a chip, different areas of a computing system, different cities, etc.). Specifically, as an artifact of the physics of the generation of the photon pair (e.g., the conservation of energy), the herald and signal photons of a photon pair are entangled in time, as they are produced at substantially exactly the same moment in time. As such, if a herald photon of photon pair is provided to one quantum circuitry block while the signal photon of the same photon pair is provided to another quantum circuitry block the entanglement in time of the two photons of the pair may be utilized to transfer information between quantum circuit blocks (e.g., to perform signaling, teleportation or transfer of state by sensing the decoherence of a photon of the photon pair).

For example, in one embodiment, a filter may be disposed between the photon pair source and the quantum circuitry block on each output port of the photon pair source such that the respective output port of the photon pair source is provided as an input to the corresponding filter on that output port. Each filter may have a herald output and a signal output as discussed. If a herald is received at that filter it may be routed to the herald output of that filter, if a signal photon is received at the input of the filter it may be routed to the signal output of that filter, and if both a herald photon and a signal photon is received at that filter on the output port of the photon pair source, the herald photon is routed to the herald output and the signal photon is routed to the signal output. The signal output of each filter may thus be provided to the associated quantum circuit block on the output port of the photon pair source, such that if a signal photon is received by the filter on the output port of the photon pair source it is provided on the signal output of the filter to the (signal input of) the quantum circuit block on that output port. In these types of embodiments, one or more of the herald outputs of each of the filters may be provided to separate quantum circuitry blocks. For example, a herald output of one filter may be provided to a quantum circuit block while the herald output of another filter may be provided to a detector stack to detect the output (the output vector) of the quantum circuitry blocks. Alternatively, in other embodiments, one or more of the herald outputs of each filter may be provided to a quantum circuit blocks such that the photon pair may coordinate the operation of the respective quantum circuit blocks to which they are provided. Here, as can be seen, computational efficiency is increased to around 100% (again under ideal conditions), as some type of quantum processing can be performed by one or more of the quantum circuitry blocks using the photon pair produced by the photon pair source each time such a photon pair is produced.

Figure 3B:
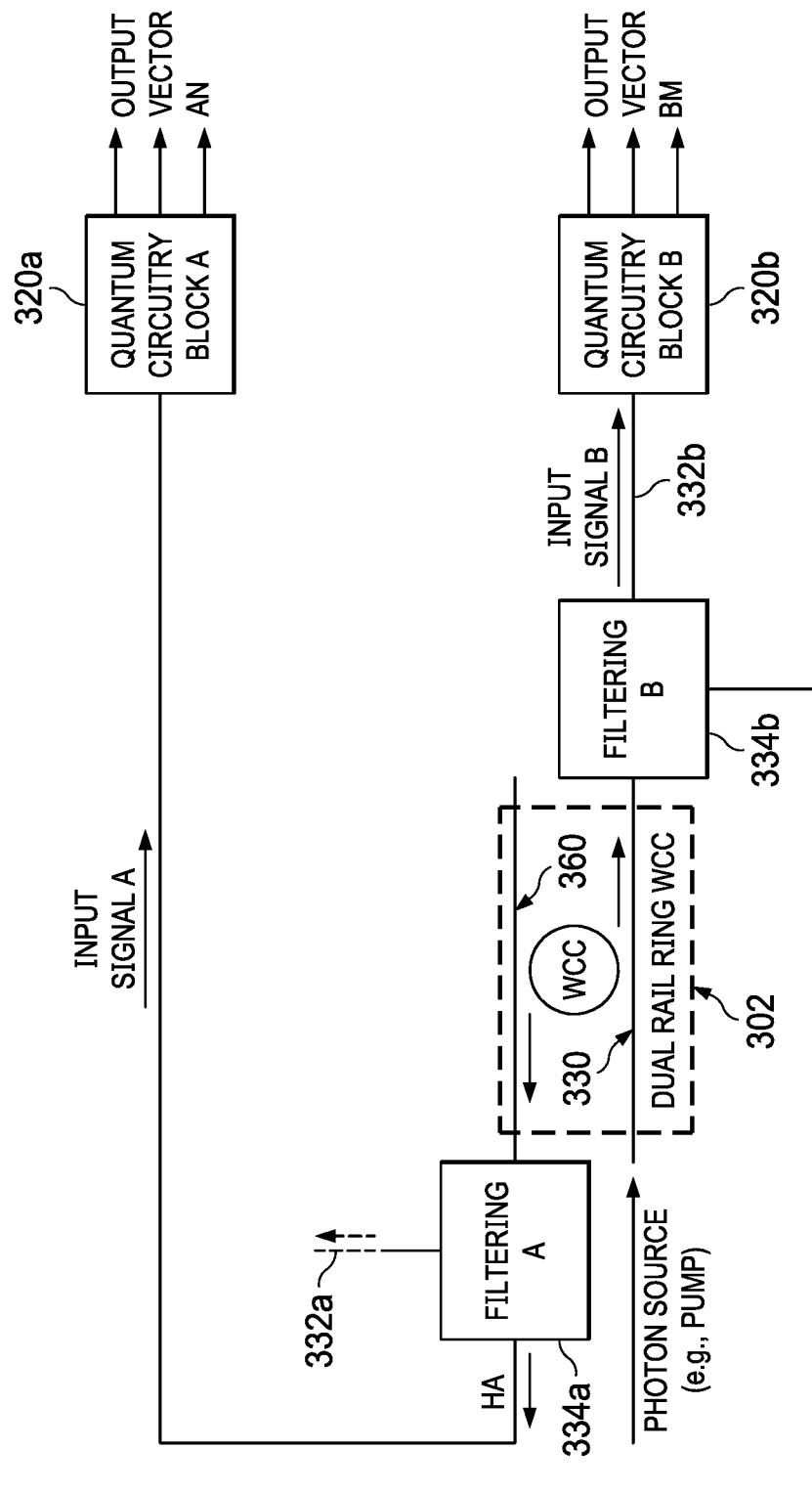
FIG. 3B is a block diagram of a quantum system according to one embodiment.

Thus, FIG. 3B depicts an alternate embodiment of a quantum system, where both signal and herald photons are routed from photon pair source 302 to quantum circuitry blocks A and B 320a, 320b. As depicted, for example, the herald output HA of filter 334a may be routed to quantum circuitry block A 320a (as the input signal to quantum circuitry block A 320a), while the signal output 332b of filter 334b way be routed as the input signal to quantum circuitry block B 320b. While not depicted directly in the drawing the signal output 332a of filter 334a may also be routed to a quantum circuitry block. This embodiment supports a set of quantum operations in quantum circuitry blocks A and B 302a, 302b that are interactive or otherwise coordinated, despite the fact that they may be physically separated or distinct. This interactivity is produced by the fact that the signal and herald photons are entangled. In this way, more complex quantum operations may be performed than can be accomplished using only a single quantum circuitry block.

Figure 3C:
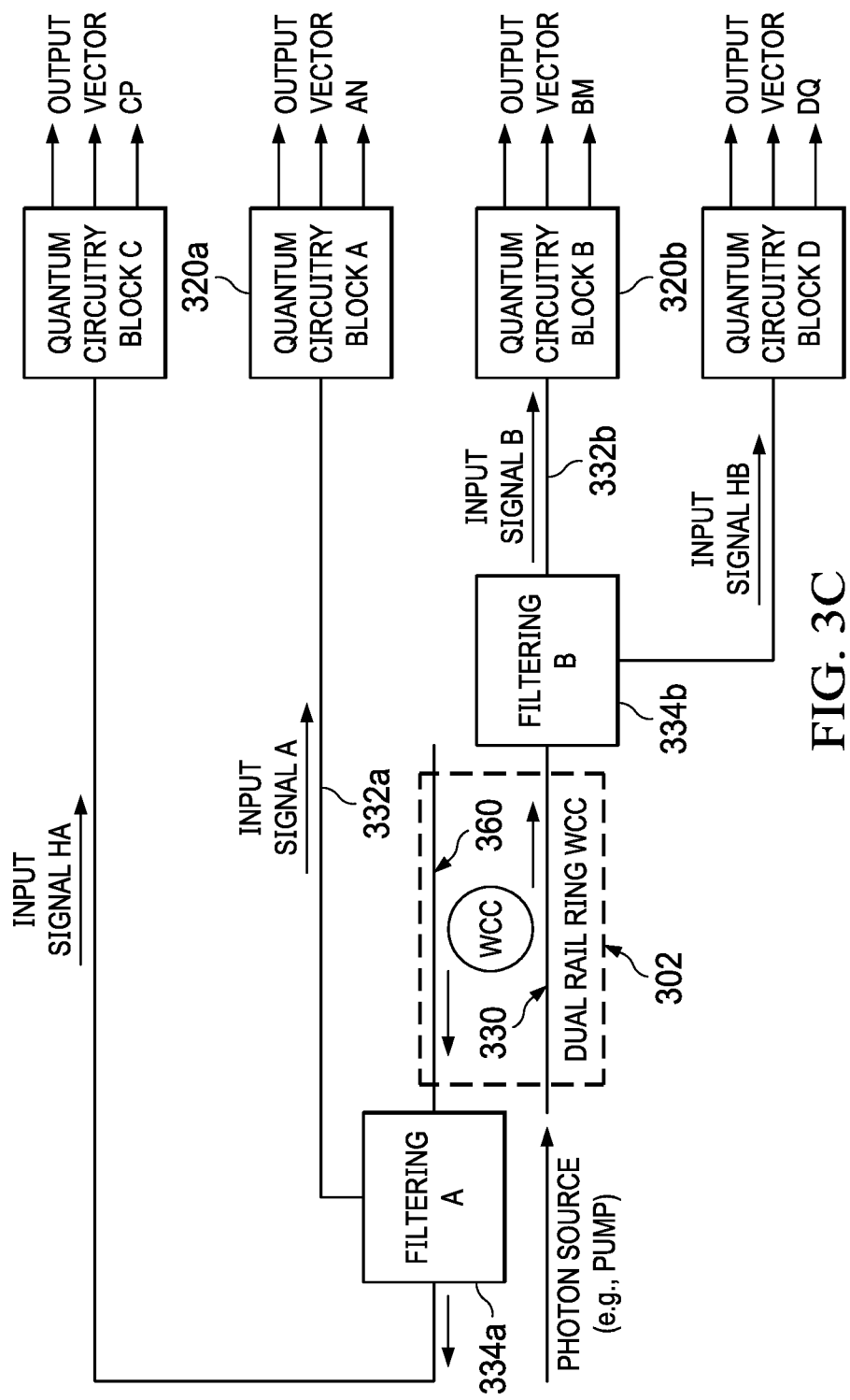
FIG. 3C is a block diagram of a quantum system according to one embodiment.

Yet another embodiment may use additional quantum circuitry blocks connected to the (e.g., unused) outputs of quantum system 300, with the same effect of enabling more complex quantum operations using distinct circuitry blocks that are linked by entangled inputs. An example of such an embodiment is depicted in FIG. 3C. Here, both the signal output 332a, 332b and herald output HA, HB of each filter 334 are provided to respective quantum circuitry blocks. Additionally, one or both the herald paths HA, HB may include additional quantum circuitry before any detection or wavefunction collapse. As an example, a quantum circuitry block may be a series of quantum repeaters (e.g., detectors may not need to be in physical proximity to the quantum circuitry block).

In the embodiments depicted in FIGS. 3A and 3B, there are N outputs for quantum circuit block A and M outputs for quantum circuit block B. Thus there is a vector, $\vec{AN}$, of dimension N for the outputs, $A_i$, of quantum circuit block A, and there is a vector, $\vec{BM}$ of dimension M for the outputs, $B_i$, of quantum circuit block B. The full output of the quantum photonic integrated circuit so configured is:

$$[HA, (\vec{AN}), HB, (\vec{BM})]$$

Quantum circuit block A may be different from quantum circuit block B, or these quantum circuit blocks may comprise identical, redundant components and gates. In a particular embodiment, quantum circuit block A and quantum circuit block B are Hadamard gates, each having an output vector of dimension N=M=2. This configuration comprises an entropy generator for a dual rail true random number generator. For this embodiment, the full output for this quantum photonic integrated circuit is the vector of probabilities:

$$[HA, A_1, A_2, HB, B_1, B_2]$$

This vector, over time, provides input to an extraction algorithm.

As can be understood then, embodiments may substantially increase the computational efficiency of heralded quantum computing systems with respect to usage of photon pairs produced by a photon pair sources by allowing some form of quantum processing to occur for each photon pair produced by the photon pair source. However, other sources of computational inefficiencies and other impediments to successful quantum computer remain in such quantum systems. The use of photodetectors to detect the output of quantum circuitry in such quantum systems is one instance of such additional problems. Specifically, as has been discussed, a detector stack (e.g., photodetectors) may be used to detect the output (e.g., a photon) of a quantum circuitry block. These detectors are, however, not infallible. They can exhibit anomalous readings, known as "dark counts", whereby the detector registers a count without an incident photon. In other situations, the detector may not register an event, even if a photon is actually present. These "non-detection" events represent a decreased sensitivity (or efficiency) for the detector. In particular, as it may be desired to detect the presence of single photons on the output of quantum circuitry, many quantum computing systems may increase the efficiency of such detectors by boosting the detector bias voltage. But this boosting of the voltage also increases the sensitivity of the detectors to noise from external sources, such as leakage through the quantum circuitry itself or by stray cosmic ray particles transiting the system, thus increasing the detector's (unwanted) dark count.

It is thus desirable to decrease this dark count by photodetectors by blocking input to the detectors until such a time when a photon is expected or may otherwise need to be detected. Accordingly, embodiments of quantum systems as used herein may utilize a modulator disposed on the output of the quantum circuitry between the quantum circuitry and the detector stack adapted to detect the presence of photons on the output of the quantum circuitry. The modulators and detectors may, for example, be integrated on a chip including such quantum circuitry. These modulators may be optical modulators adapted to be gated to block light or to be transparent. Thus, these modulators may be utilized to block stray light from the detector stack during an interval of time when a photon is not expected or scheduled to arrive. The modulators can then be gated to be transparent when it is desired for the detector to measurement photons on the output of the quantum circuitry.

For example, in one embodiment, the modulators may be coupled to the photon source of the quantum system such that they can be gated to be open (transparent) based on the output of the photon source for the quantum system, so these modulators are opened only when the photon source produces a photon. The modulators can then be closed (gated to block light) at some time after the photon source produces a photon. In one embodiment, for example a timing function with a probabilistic exponential tail based on the type of photon source or design of quantum system or quantum circuits therein may be utilized such that the timing function may be employed to open or close the modulators based on the output of the photon source, or at a time after a photon is emitted by the photon source. In this manner, faster and more reliable measurements may be made in quantum systems, increasing the efficiency of the quantum systems by increasing the reliability, and thus the usefulness of the output of the detectors of the quantum system.

Figure 4:
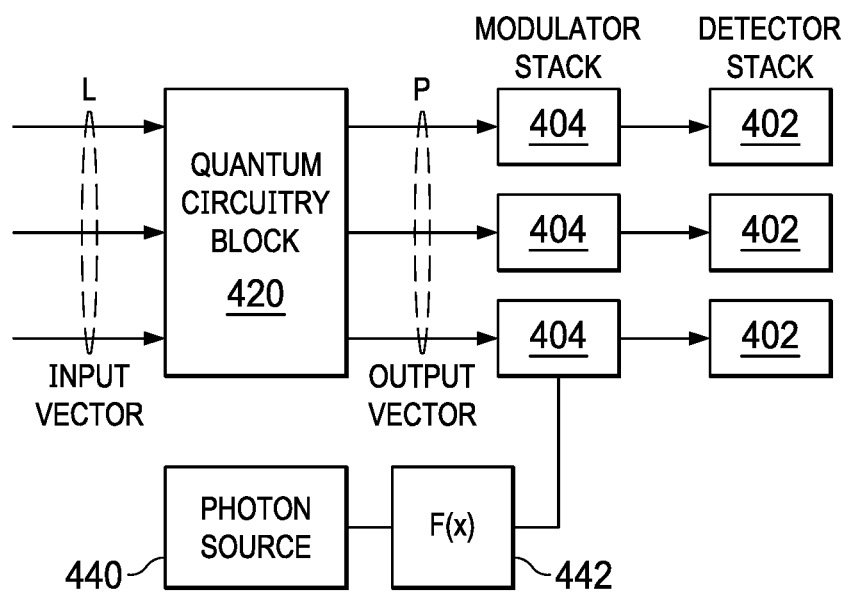
FIG. 4 is a block diagram of a quantum system including modulators used with detectors according to one embodiment.

Referring now to FIG. 4, one embodiment of a quantum system where modulators 404 are utilized with detectors 402 is depicted. Specifically, detectors 402 (e.g., the input of the detectors 402) are coupled to the output of the quantum circuit block 420. The detectors 402 may be used to collapse the wavefunctions of an output vector of some dimension P which is output from a quantum circuit block 420 that process an input vector of dimension L where L and P are typically positive integers. Detectors 402 used in these types of quantum measurements may be sensitive to the single photon level and hence are susceptible to noise and false triggering. Accordingly, modulators 404 are disposed between quantum circuit block 420 and detectors 402 (e.g., in front of the detectors 402). For example, the modulators 404 and detectors 402 may be integrated directly onto a chip (e.g., that may also include quantum circuit block 420). These modulators 404 may be utilized to block stray light from the detectors 402 during an interval of time when a photon (e.g., wavepacket) is not expected or scheduled to arrive. The modulators 404 will be transparent when the measurement is to be made by the detector 402.

Specifically, in one embodiment, the modulators 404 may be coupled to the photon source 440 of the quantum system such that modulator 404 are gated to be open (transparent) based on the output of the photon source 440 for the quantum system, so these modulators 404 are opened only when the photon source 440 produces a photon (e.g., and for some time thereafter). The modulators 404 can then be closed (gated to block light) at some time after the photon source 440 produces a photon. In one embodiment, for example a timing function 442 with a probabilistic exponential tail based on the type of photon source 440 or the design of quantum system or quantum circuits therein may be utilized such that the timing function 442 may be employed to open or close the modulators based on the output of photon source 440, such as at a time after a photon is emitted by the photon source 440.

The invention and the various features and advantageous details thereof are explained more fully with reference to the nonlimiting embodiments that are illustrated in the accompanying drawings and detailed in the following included description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally then, in this disclosure, the invention has been described with reference to specific embodiments. However, one of ordinary skill in the art appreciates that various modifications and changes can be made without departing from the scope of the invention. Accordingly, this disclosure is to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A quantum system, comprising:
a photon pair source adapted to produce an entangled photon pair comprising a signal photon and a herald photon, the photon pair source comprising a first output and a second output, the photon pair source adapted to produce the signal photon on the first output or the second output and to produce the herald photon on the first output of the photon pair source or the second output of the photon pair source;
a first filter coupled to the first output of the photon pair source, the first filter having a first signal output and a first herald output and adapted to differentiate the herald photon from the signal photon to route the herald photon to the first herald output and the signal photon to the first signal output;
a second filter coupled to the second output of the photon pair source, the second filter having a second signal output and a second herald output and adapted to differentiate the herald photon from the signal photon to route the herald photon to the second herald output and the signal photon to the second signal output;
a first quantum circuitry block having a first input coupled to the first signal output of the first filter and adapted to process the signal photon or the herald photon without decohering the photon pair when the signal photon or the herald photon is provided to the first quantum circuitry block; and
a second quantum circuitry block coupled to the second signal output of the second filter and adapted to process the signal photon or the herald photon without decohering the photon pair when the signal photon or the herald photon is provided to the second quantum circuitry block.

2. The quantum system of claim 1, wherein the first herald output or the second herald output is coupled to a detector, the detector coupled to a first output of the first quantum circuitry block or to a second output of the second quantum circuitry block.

3. The quantum system of claim 1, wherein the first quantum circuitry block and the second quantum circuitry block comprise identical circuitry.

4. The quantum system of claim 1, wherein the photon pair source is a wavelength converter.

5. The quantum system of claim 4, wherein the wavelength converter comprises a dual rail single source ring resonator.

6. The quantum system of claim 1, wherein the signal photon has a first wavelength and the herald photon has a second wavelength.

7. The quantum system of claim 6, wherein the first filter and the second filter are photonic filters adapted to differentiate the signal photon and the herald photon based on the first wavelength or second wavelength.

8. The quantum system of claim 1, wherein the first herald output of the first filter or the second herald output of the second filter are coupled to a third quantum circuitry block adapted to operate in coordination with the first quantum circuitry block or the second quantum circuitry block.

9. A method for operating a quantum system, comprising:
operating a photon pair source to produce an entangled photon pair comprising a signal photon and a herald photon, the photon pair source comprising a first output and a second output, the photon pair source adapted to produce the signal photon on the first output or the second output and to produce the herald photon on the first output of the photon pair source or the second output of the photon pair source;
operating a first quantum circuitry block having a first input coupled to a first signal output of a first filter, the first quantum circuitry block adapted to process the signal photon or the herald photon without decohering the photon pair when the signal photon or the herald photon is provided to the first quantum circuitry block; and
operating a second quantum circuitry block coupled to a second signal output of a second filter, the second quantum circuitry block adapted to process the signal photon or the herald photon without decohering the photon pair when the signal photon or the herald photon is provided to the second quantum circuitry block, wherein
the first filter is coupled to the first output of the photon pair source, the first filter having the first signal output and a first herald output and adapted to differentiate the herald photon from the signal photon to route the herald photon to the first herald output and the signal photon to the first signal output; and
the second filter is coupled to the second output of the photon pair source, the second filter having the second signal output and a second herald output and adapted to differentiate the herald photon from the signal photon to route the herald photon to the second herald output and the signal photon to the second signal output.

10. The method of claim 9, wherein the first herald output or the second herald output is coupled to a detector, the detector coupled to a first output of the first quantum circuitry block or to a second output of the second quantum circuitry block.

11. The method of claim 9, wherein the first quantum circuitry block and the second quantum circuitry block comprise identical circuitry.

12. The method of claim 9, wherein the photon pair source is a wavelength converter.

13. The method of claim 12, wherein the wavelength converter comprises a dual rail single source ring resonator.

14. The method of claim 9, wherein the signal photon has a first wavelength and the herald photon has a second wavelength.

15. The method of claim 14, wherein the first filter and the second filter are photonic filters adapted to differentiate the signal photon and the herald photon based on the first wavelength or second wavelength.

16. The method of claim 9, wherein the first herald output of the first filter or the second herald output of the second filter are coupled to a third quantum circuitry block adapted to operate in coordination with the first quantum circuitry block or the second quantum circuitry block.

17. A quantum system, comprising:
 a photon source adapted to produce a photon;
 a quantum circuitry block adapted to perform quantum processing based on the photon, the quantum circuitry block having an output, the quantum circuitry block adapted to process entangled photons without decohering those entangled photons;
 a detector having an input coupled to the output of the quantum circuitry block, the detector adapted to detect the presence of the photon on the output of the quantum circuitry block; and
 a modulator disposed on the output of the quantum circuitry block between the quantum circuitry block and the input of the detector, wherein the modulator is adapted to block the input to the detector or be transparent based on the photon produced by the photon source.

18. The quantum system of claim 17, wherein the modulator is transparent during a time interval associated with the production of the photon.

19. The quantum system of claim 18, wherein the time interval is based on a timing function based on the photon source.

20. A quantum system, comprising:
 a photon pair source adapted to produce an entangled photon pair comprising a signal photon and a herald photon, the photon pair source comprising a first output and a second output, the photon pair source adapted to produce the signal photon on the first output or the second output and to produce the herald photon on the first output of the photon pair source or the second output of the photon pair source;
 a first filter coupled to the first output of the photon pair source, the first filter having a first signal output and a first herald output and adapted to differentiate the herald photon from the signal photon to route the herald photon to the first herald output and the signal photon to the first signal output;
 a second filter coupled to the second output of the photon pair source, the second filter having a second signal output and a second herald output and adapted to differentiate the herald photon from the signal photon to route the herald photon to the second herald output and the signal photon to the second signal output;
 a first quantum circuitry block having a first input coupled to the first signal output of the first filter, the first quantum circuitry block adapted to process the signal photon or the herald photon without decohering the photon pair when the signal photon or the herald photon is provided to the first quantum circuitry block; and
 a second quantum circuitry block coupled to the second signal output of the second filter, the second quantum circuitry block adapted to process the signal photon or the herald photon without decohering the photon pair when the signal photon or the herald photon is provided to the second quantum circuitry block;
 a detector having an input coupled to the output of the first quantum circuitry block or the second quantum circuitry block, the detector adapted to detect the presence of a photon on the first output of the first quantum circuitry block or the second output of the second quantum circuitry block; and
 a modulator disposed on the output of the first quantum circuitry block between the first quantum circuitry block and the input of the detector or disposed on the output of the second quantum circuitry block between the second quantum circuitry block and the input of the detector, wherein the modulator is adapted to block the input to the detector or be transparent based on the photon pair produced be the photon source.

* * * * *